US005441794A

United States Patent [19]

Hitomi et al.

[11] Patent Number: 5,441,794

[45] Date of Patent: Aug. 15, 1995

[54] THERMAL MELT TRANSFER COLOR INK SHEET

[75] Inventors: Chiyoji Hitomi, Ibaraki, Japan; Akinari Kaneko, Essex, England; Jun Hoshikawa, Ibaraki, Japan

[73] Assignee: Imperial Chemical Industries, PLC, London, England

[21] Appl. No.: 936,050

[22] Filed: Aug. 28, 1992

[30] Foreign Application Priority Data

Aug. 29, 1991 [JP] Japan .................................. 3-218833

[51] Int. Cl.$^6$ .................................................. B32B 3/00

[52] U.S. Cl. .................................... 428/195; 428/204; 428/207; 428/323; 428/688; 428/913; 428/914

[58] Field of Search ............... 428/206, 207, 195, 913, 428/914, 480, 195, 204, 323, 402, 688

[56] References Cited

U.S. PATENT DOCUMENTS 4,783,375 11/1988 Hashimoto et al. ................ 428/480

4,804,977 2/1989 Long ................................ 346/76 L

FOREIGN PATENT DOCUMENTS 2270623 12/1975 France ........................ G03D 16/04

478672 9/1969 Germany ...................... B41J 31/00

63-161445 7/1988 Japan .

0316786 1/1991 Japan .

*Primary Examiner*—Patrick J. Ryan

*Assistant Examiner*—William A. Krynski

*Attorney, Agent, or Firm*—Cushman, Darby & Cushman

[57] ABSTRACT

An ink sheet for making thermal transfer colour recordings, with practically acceptable high speed and high resolution using a semiconductor laser beam, comprises a support film coated with an opto-thermal conversion layer to generate heat by absorbing the laser beam, and an overlying thermal melt transfer ink layer, wherein the opto-thermal conversion layer is 5 μm thick or less, and in the wavelength region of 700 nm to 900 nm has a laser beam transmittance of 5% or less.

4 Claims, 3 Drawing Sheets

THERMAL MELT TRANSFER COLOR INK SHEET

FIELD OF THE INVENTION

This invention relates to a thermal melt transfer colour recording and it particularly relates to a ink sheet to make a thermal melt transfer by using laser beam.

BACKGROUND OF THE INVENTION

For thermal sensitive recording systems utilising changes in physical properties and chemical reactivity of a material corresponding to an input of thermal energy, many proposals have been already made. Among them, a thermal sensitive colouring recording system and a thermal sensitive transfer recording system have been actively developed in recent years. The latter includes thermal melt transfer systems, which have found applications in printers, facsimile machines, and copiers for example, because of their capability of recording on plain paper, their superiority of light fastness, stability and shelf life of the recorded image, and their high reliability due to simplicity of its recording mechanism, etc.

Unfortunately, these known machines are not without their problems. Thus when a transfer image with a high precision and a high resolution is required for example, the thermal head becomes expensive. There are problems and difficulties in making a heater element small, and in controlling the heat generated by the heater element. Moreover, when an image with a large size is to be printed, it is extremely difficult to make a line head which operates uniformly throughout its length. If laser beam is used as the heat source, a spot diameter can be focused in a small size and thus a transferred image with a high precision and a high resolution can be obtained.

In the case of a beam source of a compact and a relatively low price, such as a semiconductor laser for example, the speed was not always sufficient because of the low output of the source. In order to utilise the energy of the semiconductor laser more effectively, it has been proposed to incorporate a substance (hereinafter, it is simply called an "opto-thermal conversion substance") which has a capability of an opto-thermal conversion to absorb a beam of 700–900 nm, a wavelength region of the semiconductor laser, in a colour material layer (Japan patent laid-open Tokukai Sho 63-319192). However, in case of the thermal melt transfer recording system, since an ink layer itself is transferred to a receiving paper, there was a drawback that the colour purity of an image was deteriorated by a colour of the opto-thermal conversion substance.

It has also been proposed to prepare an independent opt-thermal conversion layer to prevent scattering and transferring of ash by igniting a binder of a layer containing the opto-thermal conversion substance in the dye diffusion type transfer recording system (Japan patent laid-open Tokukai Hei 2-252580) or to make a constant output of the laser beam to each colour ink in the thermal melt transfer colour recording system (Japan patent laid-open Tokukai Sho 63-22684). However in the thermal melt colour transfer recording system using a semiconductor laser beam as a heat source, it was strongly demanded to make an ink sheet by which a practical recording speed could be obtained.

As described above, for a colour printer for office use for which downsizing and low power consumption are required, it is desirable to obtain a practical recording speed while using a relatively low output energy source such as a semiconductor laser, and for this purpose it is indispensable to improve the efficiency of the opto-thermal conversion layer. This invention offers an ink sheet for the thermal melt transfer type colour recording to give a practical recording speed at a low output by providing a more effective opto-thermal conversion layer.

SUMMARY OF THE INVENTION

According to the present invention a thermal melt transfer colour ink sheet comprises a support film having thereon at least one opto-thermal conversion layer to generate heat by absorbing a laser beam, and a thermal melt transfer ink layer comprising mainly a thermal melt wax component and a colouring agent dispersed or dissolved in the wax component, wherein the opto-thermal conversion layer is 5 μm thick or less, and in the wavelength region of 700 nm to 900 nm has a laser beam transmittance of 5% or less.

BRIEF DESCRIPTION OF THE DRAWINGS

The invention will now be explained in detail, with reference to the accompanying drawings, in which.

Figure 1:
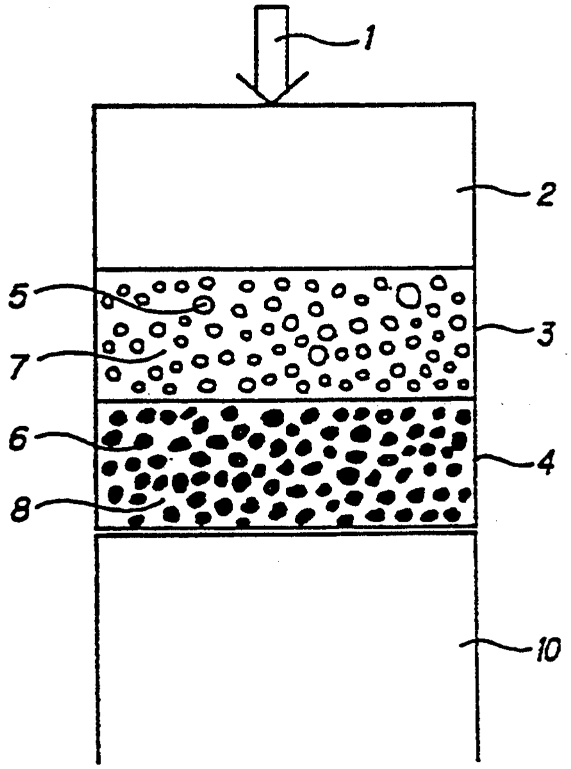
FIG. 1 is a cross sectional drawing showing an example of the thermal melt transfer colour ink sheet of this invention.

The thermal melt transfer colour ink sheet shown in FIG. 1, comprises a transparent support film 2, having thereon an opto-thermal conversion layer 3 and a thermal melt transfer ink layer 4. The opto-thermal conversion layer comprises an opto-thermal conversion substance 5 in a binder 7 (hereinafter called the "conversion layer binder"). The ink layer comprises a colouring agent 6 comprising a pigment or a dye, and a binder 8 (hereinafter called the "ink layer binder").

DESCRIPTION OF PREFERRED EMBODIMENTS

Figure 2:
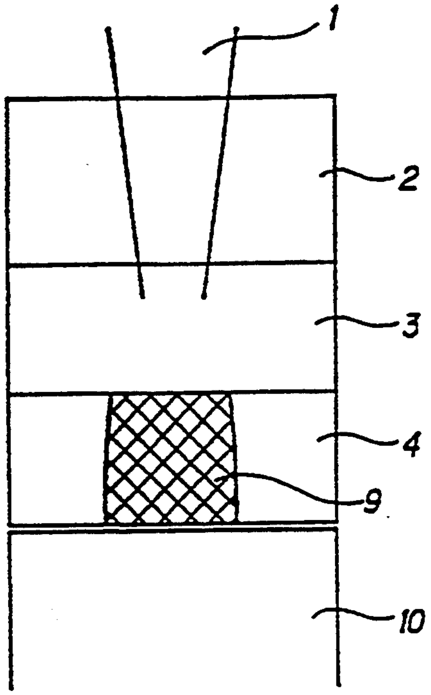
FIGS. 2 and 3 are cross sectional drawings showing the image recording method using the thermal melt transfer colour ink sheet of this invention.
Figure 3:
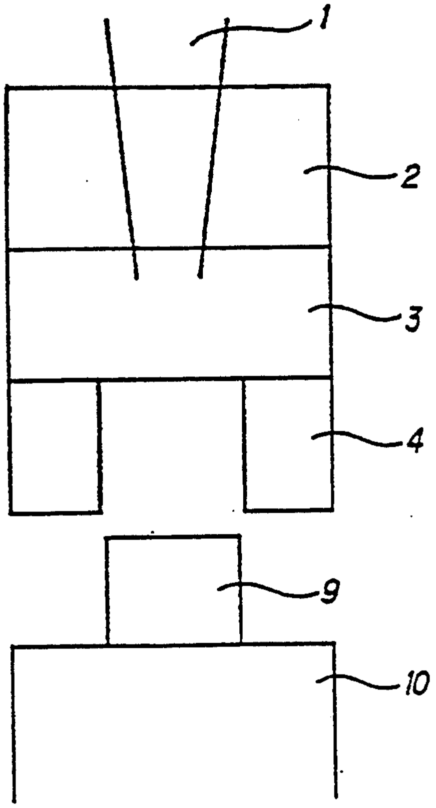

Referring to FIGS. 2 and 3, the laser beam 1 is shown entering through the transparent support 2. It is focused onto a point inside the opto-thermal conversion layer 3 by a conventional lens system, and at this focus point, the beam is absorbed and heat is generated. As opposite sides of the opto-thermal conversion layer are contacted by the transparent support 2 and the ink layer 4 respectively, the heat is transferred to both sides in proportion to the their heat conductivities, and the adjacent section 9 of the ink layer is melted. In order to utilise effectively the heat energy generated by the absorption, it is preferable that the heat conductivity of the ink layer be relatively higher than that of the transparent support.

Only the melted section 9 of the ink layer 4 is transferred to a receiver paper 10 as shown in the FIG. 3. Since all three of the transparent support 2, the opto-thermal conversion layer 3 and the ink layer 4 are thin films, the thermal diffusion parallel to the plane of the films is relatively small, thus it is possible to record a small dot almost corresponding to the irradiated spot of the laser beam and a high speed recording as well as a high resolution recording can be achieved.

The support 2 used in this embodiment is a substantial transparent film to enable the laser beam to pass through it. It also needs to have sufficient strength to hold the opto-thermal conversion layer 3 and the ink layer 4 and to withstand the stresses of the transfer printing process and other mechanical stress. Good adhesion to the opto-thermal conversion layer and a heat resistance or a low heat transfer property, are also required.

The heat resistance temperature of the support needs to be 80° C. or more, and is preferably at least 90° C. The thermal conductivity, should be less than about 1W/m °K, and is preferably 0.5 W/m °K or less. If it is more than 1W/m °K, the heat converted in the opto-thermal conversion layer is diffused inside the transparent support, and it reduces the efficacy of the heat transfer to the ink layer. The beam transmittance of such transparent support at 700–900 nm should be 60% or more, and is preferably at least 65%. If it is less than 60%, a sufficient opto-thermal conversion can not be achieved in such a printing system.

The support may comprise a film formed from resins such as polyethylene terephthalate polyethylene naphthalate, polycarbonate, polymethyl methacrylate, polyether sulphone, polyether ether ketone, polyether imide, polysulphone. Polyethylene terephthalate film is especially suitable because it sufficiently fulfils the aforementioned properties required.

The resin of the support can also contain additives, such as a thermal property modifier to improve the thermal stability, a releasing agent or an antistatic agent, for example. Other coatings can also be applied, including for example, coatings to assist handling of the support when used on a roll, containing a silicone or fluorine family compound, or a crosslinked polymer layer, a metal layer, or ceramic layer, etc. can be added to improve rolling when applied on the side of the support which contacts the roll.

The thickness of the support is preferably 2–20 μm. While thicker supports may not affect the thermal transfer, supports thicker than about 20 μm can lead to ink sheet rolls becoming large, and not meeting the downsizing of the equipment. If it is below 2 μm, it tends to cause an inconvenience on the handling.

The opto-thermal conversion layer to be used in this invention has a function to absorb the laser beam, to convert the beam to heat as and where it is absorbed, and comprises an opto-thermal conversion substance 5 dispersed in a binder as shown in FIG. 1.

As for the thickness of the opto-thermal conversion layer, it is 5 μm or less and is preferably 3 μm or less. If it is not less than 5 μm, because lots of thermal energy is consumed for rising temperature of the opto-thermal conversion layer itself when the laser beam is entered, it results a shortage of the thermal energy, relatively, to be used to rise the temperature and to melt the ink layer and thus it is difficult to achieve a high speed recording.

In order to exhibit the opto-thermal conversion property at the maximum, an opto-thermal conversion substance is required having excellent beam absorption and opto-thermal conversion property at the service wavelength region. It is also desirable to have an excellent dispersion of the opto-thermal conversion substance in the binder. The opto-thermal conversion substance can be any substance which meets the above absorption and conversion requirements.

Examples of preferred opto-thermal conversion substances include a metal powder of high thermal conductivity, a metal oxide powder, a metal sulphide powder, carbon blacks, graphite, polymethine dye, azulenium family, pyrylium family, thiopyrylium family and phthalocyanine family organic materials. These can be used independently or by mixing two or more.

A preferred opto-thermal conversion substance, which combines the opto-thermal conversion capability with low cost and an ease of handling, is carbon black. This has especially excellent opto-thermal conversion capability, dispersibility, especially when having a primary particle size in the range 0.015–0.07 μm, our preferred range being 0,016–0.030 μm. When the primary particle size is less than 0.015 μm or more than 0.07 μm, we find the absorption property is deteriorated.

The carbon black in the market is a coagulate of a melt bonded product of the primary particles, and to be used in this invention, it is ground in a wet system by mixing it with an organic liquid which is a solvent for the binder, to form a coating composition for the opto-thermal conversion layer containing the ground carbon black as a dispersed product (hereinafter, the operation of grinding and the dispersing is simply "dispersion"). By a preparatory test of the dispersion operation, complete conditions are set up to make the mean particle size of the carbon black dispersed product at 0.4 μm or less and the coating composition for the opto-thermal conversion layer containing the desired carbon black dispersed product, can be obtained.

If the mean particle size of the said carbon black dispersed product exceeds 0.4 μm, it is difficult to make the dry thickness of the opto-thermal conversion layer in the preferred region of 3 μm or less, and if the layer thickness approaches 5 μm, it becomes increasingly difficult to maintain the opto-thermal conversion rate of the said opto-thermal conversion layer in a preferred condition of 95% or more.

For making the dispersion, the binder is preferably selected according to the presence or absence of polarity of the opto-thermal conversion substance. Thus in the case of carbon black showing polarity of its particle surface, it is preferable to use a binder having polarity.

In case that the opto-thermal conversion substance is a phthalocyanine family pigment, etc., because the pigment particle is extremely small or it dissolves in an organic solvent, a good dispersibility and a high opto-thermal conversion capability can be expected, and an opto-thermal conversion layer having a smooth surface can also be obtained, and therefore a transferred image with a good gloss can be obtained.

As for the content of the opto-thermal conversion substance in the said opto-thermal conversion layer, it is at an extent of 3–90 weight % and is preferably 10–85 weight %. If the content is not more than 3 weight %, the heat generated is insufficient, and if it exceeds 90 weight %, there is a tendency to cause a partial releasing insufficiency with the ink layer and a partial adhesion insufficiency with the support when it is recorded by the transfer printing due to deterioration of the mechanical strength of the opto-thermal conversion layer. As for carbon black, because of its difficulty of making dispersion itself, the upper limit is further limited to 70 weight %, and is preferably 60 weight %.

In this invention, in order to hold the opto-thermal conversion substance in the opto-thermal conversion layer, and to bind the said layer to the support, a binder is used. As for the binder, a resin to have a high degree of the dispersibility with the aforementioned opto-thermal conversion substance, an adhesion with the support layer, a releasing property with the ink layer and a heat resistance at the opto-thermal conversion is preferable, and for example, cellulose derivatives such as cellulose acetate, cellulose acetate butyrate, cellulose acetate propionate, nitrocellulose, etc., polyurethane resin, polyester resin, polyvinyl butyral, vinyl chloride-/vinyl acetate coplymer, ureamelamine resin, ureaformalin resin, epoxy resin, polyimide resin, polyether sulphone resin, etc. can be enumerated, These resins can be used independently, or by mixing them.

Binders suitable for carbon black are especially cellulose acetate butyrate, and it can be used independently or by mixing with other materials.

As for dispersing or dissolving the opto-thermal conversion layer in the binder, an existing method can be used. When the opto-absorbing substance wholly dissolves in the solvent for the binder, no particles present, and there are advantages that the opto-thermal conversion layer obtained by coating and drying on the support has a superior surface smoothness and a transferred image with an excellent gloss can be obtained.

On the other hand, when the opto-thermal conversion substance does not dissolve in the binder solvent, it is dispersed and is mixed in the binder solution by using, for example, a ball mill, a sand mill, a triple roller, an attriter, a kneader, etc. It can be also mixed by melting using a heating type triple roller, a heating pressure kneader, a banbury mixer, etc. without using a solvent, etc.

As for solvents to be used for the aforementioned solution, dispersion, mixing, etc., they are, for example, methyl ethyl ketone, cyclohexane, toluene, ethyl acetate, tetrahydrofuran, acetone, xylene, methyl isobutyl ketone, isopropyl alcohol, ethanol, etc.

When it is dispersed, a dispersing agent can be used to improve the dispersibility. As for the suitable dispersing agents, representative examples are shown by higher alcohol sulphates such as sodium salt of lauryl sulphate; polyoxyalkylene alkyl sulphates such as sodium salt of polyoxyethylene lauryl sulphate and alkyl allyl sulphonates such as sodium n-dodecyl benzenesulphonate. Anionic surfactants and nonionic surfactants, of which representative examples are shown by polyoxyalkylene higher fatty acid esters such as polyoxyethylene monolauric acid ester and polyoxyalkylene alkyl phenyl ethers such as polyoxyethylene nonyl phenyl ether can also be enumerated. Polymeric dispersants such as Solsperse 24000 ("Solsperse" is a trademark of ICI) and Solsperse 17000 can also be used.

The opto-thermal conversion substance/binder dispersion or the melted mixture thus prepared is coated and can be printed on the support film by existing solution coating methods, eg by using a gravure coater, a wire bar, etc. or by a hot melt coating method.

The ink layer to be used in this invention comprises a colouring agent and a binder for the ink layer. The binder for the ink layer has the main component consisting of a thermal melt substance and/or a thermoplastic resin. The thermal melt substance is a solid or a semisolid substance having a thermo-softening point measured by a thermo mechanical analyser Type TAC 7 of Perkin Elmer in a range of normally 50°–160° C.

Examples of suitable thermal melt substances include vegetable waxes such as carnauba wax, haze wax, etc; animal waxes such as bees wax, shellac wax, spermaceti wax, etc; petroleum waxes such as paraffin wax, microcrystalline wax, polyethylene wax, ester wax, acid wax, etc; and mineral waxes such as montan wax, etc. In addition to these waxes, higher fatty acids such as palmitic acid, stearic acid, margaric acid, behenic acid, etc; higher alcohols such as palmityl alcohol, stearyl alcohol, etc; higher fatty acid esters such as cetyl palmitate, melissyl palmitate, melissyl stearate, etc; amides such as acetamide, propionic acid amide, palmitic acid amide, stearic acid amide, amide wax, etc; and higher amines such as stearyl amine, behenyl amine, palmityl amine, etc; can also be enumerated.

Examples of suitable thermoplastic resins include ethylene vinyl acetate family resins, polyamide family resins, polyester family resins, polyurethane family resins, polyolefin family resinst acrylic family resins, vinyl chloride family resins, cellulose family resins, rosin family resins, elastomers such as styrene butadiene rubber, isoprene rubber, chloroprene rubber, etc., rosin malenic acid resin, and rosin derivatives.

The colouring agents to be used in this invention, are a yellow colouring agent, a magenta colouring agent and a cyan colouring agent. These can be selected from inorganic pigments, organic pigments, or organic dyes, for example.

Examples of suitable yellow colouring agents, include pigments such as Hansa Yellow A, insoluble azo family yellow pigments (anilido family), such as Fast Yellow G, Fast Yellow 10G, and diazo orange; colouring lake family pigments, such as yellow lake; acetoacetate amide family bis azo pigments, such as C. I. Pigment Yellow 12, C. I. Pigment Yellow 13, C. I. Pigment Yellow 14, etc; and yellow dyes such as C. I. Solvent Yellow 19, C. I. Solvent Yellow 77, C. I. Solvent Yellow 79, C. I. Disperse Yellow 164, etc.

Examples of suitable magenta colouring agents include pigments such as rhodamine lake B, insoluble azo family magenta pigments (naphthol family) such as brilliant carmine BS, lake carmine FB, lake red 4B, fast red FGR, lake bordeaux 5B, and toluidine magenta; insoluble azo family (anilide family) magenta pigments, such as pyrazole red; soluble azo family magenta pigments, such as lake orange, brilliant carmine 3,B, brilliant scarlet G, lake red C, lake red D, lake red R, lake bordeaux 10B, bon maroon L, and bon maroon M: and other magenta dyes such as C. I. Solvent Red 52, C. I. Solvent Red 58, and C. I. Solvent Red 8.

Examples of suitable cyan colouring agents include, for example, a phthalocyanine family cyan pigment, such as phthalocyanine blue and fast sky blue; a colouring lake family cyan pigment, such as violet lake and blue lake, a vat family cyan pigment, such as fast blue lake; and other cyan pigments, such as alkaline blue.

In this invention, a white colouring agent such as titanium dioxide and zinc oxide, or a black colouring agent such as carbon black, can be added in a an amount not to spoil the hue of each colouring agent section. Furthermore a white colouring agent section or a black colouring agent section can be separately formed.

A solution for the ink layer is obtained by mixing the colouring agent in the binder for the ink layer. To achieve this, when the binder for the ink layer is dissolved in the solvent, the colouring agent can be dispersed and mixed into the solution. When the binder for the ink layer is partially soluble in the solvent or it does not dissolve at all, a dispersion or an emulsion may be used, or by directly melting the binder for the ink layer a melted product can be formed, and into these liquids the colouring agent can be mixed. For mixing a colouring agent into an emulsion of the binder for the ink layer, it may be mixed directly during the emulsifying treatment of the binder, or a colouring agent emulsion prepared separately and then mixed.

The mixing and dispersing can be adjusted by a mixing and dispersing machine such as a ball mill, a sand mill, an attriter a triple roller, etc. And as for the mixing of the melted product of the binder for the ink layer and the colouring agent, it is carried out by using a heating type triple roller, a heating and pressure kneader, a banbury mixer, etc.

Examples of suitable solvents to dissolve the binder include toluene, xylene, isopropyl alcohol, ethanol, methanol, n-propyl alcohol, methyl ethyl ketone, methyl isobutyl ketone, cyclohexanone, ethyl acetate. For preparing dispersions and emulsions, water and aforementioned solvents can be used.

The solution for the ink layer or the melted mixture product thus prepared, is coated or printed onto the opto-thermal conversion layer by suitable solution and hot melt coating methods respectively, using a gravure coater or wire bar coater, for example.

The thickness of the ink layer depends on a specific heat, heat of fusion, etc., but it is usually 0.5–8 μm. If it is not less than 8 μm, it requires massive thermal energy to raise the temperature and to melt the ink layer, and thus it is difficult to achieve a high speed recording. On the other hand, if it is not more than 0–5 μm, the transferring property at the recording is deteriorated, and a required colour strength is not obtained.

As for the thermal melt transfer colour ink sheet thus prepared,, various auxiliary layers such as an overcoat layer to prevent low temperature transfer, an adhesion layer to improve adhesion between the support and the opto-thermal conversion layer, a releasing layer to improve releasing property between the opto-thermal conversion layer and the ink layer or a slipping layer for when a printing head is to be used at the recording, for example, can also be added.

EXAMPLES

This invention is illustrated by the following examples.

EXAMPLE 1

A 6 μm thick polyethylene terephthalate film was used as the support film. Solutions of the opto-thermal conversion layer and of the thermal melt transfer ink having below-listed compositions, were in turn prepared and coated onto one face of the support film as described below and dried, to produce a thermal melt transfer colour ink sheet according to this invention.

| Opto-thermal conversion layer | |
|---|---|
| carbon black (Mogul-J, Cabot product (USA), mean primary particle size; 0.02 μm) | 0.7 part |
| cellulose acetate butyrate (385-0.5, Hercules product (USA)) | 1.3 parts |
| dispersant (Solsperse 24000 from ICI) | 0.074 part |
| tetrahydrofuran | 17.9 parts |

A dispersion of the opto-thermal conversion substance was prepared using steel beads in a paint shaker for 2 hours at room temperature. This was coated by a bar coater method, and dried for 5 minutes in a oven at 80° C. to give an opto-thermal conversion layer of approximately 0.8 μm thick. The mean particle size of the carbon black in the dispersion for the opto-thermal conversion layer was 0.15 μm.

Thermal melt transfer ink layer

The composition for this layer comprised a mixture of the total quantities of the below-listed solutions A and B.

| | |
|---|---|
| Solution A: A emulsion comprising: | |
| paraffin wax (HNp-11, Nippon Seiro product) | 42.5 parts |
| carnauba wax (No 1, Kato Yoko product) | 14.0 parts |
| EVA (Evaflex 310, Mitsui Polychemical product) | 9.0 parts |
| oxidised microwax (Nippon Seiro product | 10.0 parts |
| water | 160.0 parts |
| dispersant (Solsperse 20000) | 1.5 parts |
| Solution B: A pigment dispersion comprising: | |
| blue pigment (Monastral BAE) | 6.8 parts |
| dispersant (Solsperse 20000) | 0.04 part |
| water | 68.0 parts |

"Monastral" is a trademark of ICI plc. A solution for the ink layer was obtained by mixing total quantities of Solution A and Solution B, and was coated onto the opto-thermal conversion layer by gravure coating method, then dried for approximately minutes on an oven at 80° C., to produce a thermal melt transfer ink sheet of 3.5 μm thickness.

EXAMPLE 2

A thermal melt transfer ink sheet was prepared in the same manner as that of Example 1, except that the grade and the content of carbon black in the opto-thermal conversion layer were changed.

| Opto-thermal conversion layer | |
|---|---|
| carbon black (R330R, from Cabot), mean primary particle size 0.028 μm) | 1.0 part |
| cellulose acetate butyrate (385-0.5) | 1.0 part |
| dispersant (Solsperse 24000) | 0.09 part |
| tetrahydrofuran | 17.9 parts |

The mean particle size of the dispersed product of carbon black in the solution for the opto-thermal conversion layer was 0.18 μm. An opto-thermal conversion layer was obtained by coating with a bar coating method and drying in an oven at 80° C. for 5 minutes, to give a thickness of approximately 1.1 μm.

An ink layer was formed on the opto-thermal conversion layer as described in Example 1, and a thermal melt transfer ink sheet of approximately 35 μm thick was obtained.

EXAMPLE 3

A thermal melt transfer ink sheet was prepared in the same manner as that of Example 1, except that the opto-thermal conversion layer below-listed using nitrocellulose was used.

| Opto-thermal conversion layer | |
|---|---|
| carbon black (R330R, mean primary particle size; 0.028 μm) | 1.3 parts |
| nitrocellulose (HIG 1/4, Asahi Chemical product) | 2.7 parts |
| dispersant (Solsperse 24000) | 0.11 part |
| methyl ethyl ketone | 24.0 parts |

The mean particle size of the dispersed product of carbon black in the coating composition for the opto-thermal conversion layer was 0.1 μm. The opto-thermal conversion layer obtained by coating with a bar coating method and by drying in an oven at 80° C. for 5 minutes was approximately 0.9 μm.

An ink layer was formed on the opto-thermal conversion layer as described in Example 1, and a thermal melt transfer ink sheet of approximately 35 μm thick was obtained.

EXAMPLE 4

A thermal melt transfer ink sheet was prepared in the same manner as that of Example 1. except that the content of carbon black in the opto-thermal conversion layer and the thickness were changed.

| Opto-thermal conversion layer | |
|---|---|
| carbon black (R330R, mean primary particle size; 0.028 μm) | 0.4 part |
| nitrocellulose (HIG 1/4) | 3.6 parts |
| dispersant (Solsperse 2400 | 0.11 part |
| methyl ethyl ketone | 24.0 parts |

The mean particle size of the dispersed product of carbon black in the solution for the opto-thermal conversion layer obtained was 0.09 μm. The thickness of the opto-thermal conversion layer obtained by coating with a bar coating method and by drying in an oven at 80° C. for 10 minutes was approximately 4.0 μm.

An ink layer was formed on the opto-thermal conversion layer as described in Example 1, and a thermal melt transfer ink sheet of approximately 3.5 μm thick was obtained.

EXAMPLE 5

A thermal melt transfer ink sheet was prepared in the same manner as that of Example 1, except that polyvinyl butyral was used for the opto-thermal conversion layer.

| Opto-thermal conversion layer | |
|---|---|
| carbon black (Mogul-L, mean primary particle size; 0.02 μm) | 1.85 parts |
| polyvinyl butyral (BL3, Hoechst product of Germany) | 1.85 parts |
| isocyanate curing agent (Coronate L, Nippon polyurethane product) | 0.9 part |
| dispersing agent (Solsperse 24000) | 0.06 part |
| tetrahydrofuran | 24.0 parts |

The mean particle size of the dispersed product of carbon black in the solution for the opto-thermal conversion layer obtained was 0.12 μm. The thickness of the opto-thermal conversion layer obtained by coating with a bar coating method and by drying in an oven at 80° C for 5 minutes was approximately 1.3 μm.

An ink layer was formed on the opto-thermal conversion layer as described in Example 1, and a thermal melt transfer ink sheet of approximately 3.5 μm thick was obtained.

EXAMPLE 6

A thermal melt transfer ink sheet was prepared in the same manner as that of Example 1, except that pigment of the thermal melt transfer ink layer was changed from the blue pigment (Monastral BEA) to a magenta pigment listed below.

| Thermal melt transfer ink layer | |
|---|---|
| Solution B: A pigment dispersion solution comprising: | |
| magenta pigment (Navy blue yellow 565, ICI product) | 6.8 parts |
| dispersant (Solsperse 20000) | 0.04 part |
| water | 68.0 parts |

An ink layer solution obtained by mixing total quantities of Solution A and Solution B, was coated on the opto-thermal conversion layer of Example 1 by gravure coating, then dried for approximately 5 minutes in an oven at 80° C., and a thermal melt transfer ink sheet of 3.5 μm thickness was obtained.

EXAMPLE 7

A thermal melt transfer ink sheet was prepared in the same manner as that of Example 1, except that an organic near infra-red absorbing pigment was used for the opto-thermal conversion layer.

| Opto-thermal conversion layer | |
|---|---|
| organic near infra-red absorbing pigment (5 101749, ICI product) | 1.3 parts |
| polyvinyl butyral(BL3) | 2.7 parts |
| isocyanate curing agent (Coronate L) | 1.35 parts |
| tetrahydrofuran | 24.0 parts |

The solution for the opto-thermal conversion layer prepared by mixing and dissolving by using a paint shaker was coated by a bar coating method and the thickness of the opto-thermal conversion layer obtained by drying in an oven at 80° C. for 5 minutes, was approximately 1.3 μm.

An ink layer was formed on the opto-thermal conversion layer as described in Example 1, and a thermal melt transfer ink sheet of approximately 3.5 μm thick was obtained.

COMPARATIVE EXAMPLE 1

A thermal melt transfer ink sheet of approximately 3.5 μm thick was prepared in the same manner as that of Example 1, except that the opto-thermal conversion layer was omitted, and the thermal melt transfer ink layer was coated directly onto the polyethylene terephthalate film base.

COMPARATIVE EXAMPLE 2

A thermal melt transfer ink sheet was prepared in the same manner as that of Example 1, except that the thickness of the opto-thermal conversion layer was 6 μm.

COMPARATIVE EXAMPLE 3

A thermal melt transfer ink sheet was obtained in the same manner to the Example 4 except that carbon black of which the primary particle size was 0.12 μm was used. The mean particle size of the dispersed product of carbon black in the solution for the opto-thermal conversion layer was 0.35 μm.

COMPARATIVE EXAMPLE 4

An opto-thermal conversion layer of approximately 4.0 μm thick and 1.6 μm of the mean particle size of the dispersed product of carbon black was obtained in the same manner to the Example 4 except that glass beads were used in stead of the steel beads and the dispersing treatment time by the glass bead dispersing method was 30 minutes. A thermal melt transfer ink layer was formed on the opto-thermal conversion layer obtained as same to the example 1 and a thermal melt transfer ink sheet was obtained.

COMPARATIVE EXAMPLE 5

A thermal melt transfer ink sheet was prepared in the same manner as that of Example 1, except that the content of carbon black in the opto-thermal conversion layer and the thickness were changed.

| Opto-thermal conversion layer | |
|---|---|
| carbon black (R330R, mean primary particle size; 0.028 μm) | 0.2 part |
| nitrocellulose (HIG 1/4) | 3.8 parts |
| dispersant (Solsperse 24000) | 0.11 part |
| methyl ethyl ketone | 32.0 parts |

The mean particle size of the dispersed product of carbon black in the solution for the opto-thermal conversion layer obtained was 0.09 μm. The thickness of the opto-thermal conversion layer obtained by coating with a bar coating method and by drying in an oven at 80° C. for 10 minutes was approximately 1.2 μm.

An ink layer was formed on the opto-thermal conversion layer as described in Example 1, and a thermal melt transfer ink sheet of approximately 35 μm thick was obtained.

Evaluation of the thermal melt transfer ink sheet

Each of the thermal melt transfer ink sheets obtained by the examples and the comparative examples was placed on smooth paper (Beck smoothness 180-Kumagaya Riki Kogyo) to make a contact with the ink layer side, and as shown in the FIG. 2, a beam of approximately 40 μm diameter (made by focusing a semiconductor laser of a single mode type (wavelength 802 nm, maximum beam output 100 mW, SDL product) was used to irradiate an area of 1 $cm^2$ at a pitch of 12.5 lines/mm. The laser beam was pulse width modulated to allow the effect of varying laser irradiation times to be evaluated. Immediately after the irradiation, the ink sheet was released from the smooth paper.

For each ink sheet, the irradiation time to the initiation of transfer onto the smooth paper, and the irradiation time to the moment when the transferred spot diameter reached the same diameter as the laser beam diameter, were determined by an optical microscope. The transfer initiation energy and transfer saturation energy were then obtained from these times. The results are shown below in Table 1.

Determination methods and definition of terms (1) Beam transmittance : Determined by Hitachi Seisakusho's spectrophotometer V-3400.

(2) Transfer initiation energy : Minimum energy to recognise a transfer on the smooth paper by eye.

(3) Transfer saturation energy : Energy for the spot diameter to reach the same diameter as the laser beam diameter.

(4) Optical density : Reflecting optical density at the transfer saturation obtained by Macbeth densitometer.

(5) Mean particle size of the dispersed product : Shimadzu Seisakusho's particle size distribution meter type SA-CP3L was used.

TABLE 1

| | Opto-thermal conversion layer | | Transfer property | | |
|---|---|---|---|---|---|
| Item | Thickness | Beam trans-mittance | Transfer initiation energy | Transfer saturation energy | Optical density |
| 1 | 0.9 | 0.8 | 0.1 | 0.2 | 1.2 |
| 2 | 1.1 | 0.5 | 0.1 | 0.2 | 1.2 |
| 3 | 0.9 | 0.4 | 0.1 | 0.2 | 1.3 |
| 4 | 4.0 | 1.5 | 0.3 | 0.5 | 1.1 |
| 5 | 1.3 | 0.05 | 0.2 | 0.3 | 1.2 |
| 6 | 0.9 | 0.8 | 0.1 | 0.2 | 1.1 |
| 7 | 1.3 | 0.6 | 0.2 | 0.3 | 1.3 |

TABLE 2

| | Opto-thermal conversion layer | | Transfer property | | |
|---|---|---|---|---|---|
| Item | Thickness | Beam trans-mittance | Transfer initiation energy | Transfer saturation energy | Optical density |
| 1 | 0.0 | — | 10 | — | — |
| 2 | 6.0 | 0.0 | 1.0 | 1.3 | 1.2 |
| 3 | 4.0 | 6.0 | 0.9 | 1.2 | 1.1 |
| 4 | 4.0 | 6.0 | 0.9 | 1.2 | 1.1 |
| 5 | 1.2 | 13 | 0.7 | 0.9 | 1.2 |

Effect of the invention

Since the present opto-thermal conversion layer absorbs the entered laser beam very effectively, converts the laser radiation to heat and transmits the generated heat to the ink layer effectively, the thermal melt transfer colour ink sheet of this invention has made possible a thermal transfer colour recording by using a semiconductor laser, with practically acceptable high speed and high resolution.

We claim:

1. In a thermal melt transfer colour ink sheet comprising a support film having thereon at least one conversion layer to generate heat by absorbing a laser beam, and a thermal melt transfer ink layer on said conversion layer consisting essentially of a thermal melt wax component and a colouring agent dispersed or dissolved in the wax component, the improvement wherein conversion layer is 5 μm thick or less, 3–90 weight % of the conversion layer consists of at least one material which generates heat by absorbing a laser beam and in the wavelength region of 700 nm to 900 nm has a laser beam transmittance of 5% or less, said material comprising carbon black particles having a mean particle size within a range of 0.015–0.07 μm; and the mean particle size of a coagulate of a melt bonded product of the carbon black is 0.4 μm or less.

2. A thermal melt transfer colour ink sheet as claimed in claim 1, wherein the support film is transparent and has a beam transmittance of at least 60% in the wavelength region 700–900 nm.

3. A thermal melt transfer colour ink sheet as claimed in claim 1, wherein 10–85 weight % of the conversion layer consists of carbon black having a mean particle size within the range 0.016–0.030 μm.

4. A thermal melt transfer colour ink sheet as claimed in claim 1, wherein the conversion layer is 3 μm thick or less.

* * * * *